(12) United States Patent
Izumida et al.

(10) Patent No.: US 7,230,186 B2
(45) Date of Patent: Jun. 12, 2007

(54) COVERED WIRE AND AUTOMOBILE-USE WIRE HARNESS

(75) Inventors: Hiromu Izumida, Hyogo (JP); Nozomu Kawabe, Hyogo (JP); Shinei Takamura, Hyogo (JP); Teruyuki Murai, Tokyo (JP); Takashi Yoshioka, Osaka (JP); Toshio Shimizu, Mie (JP)

(73) Assignees: Sumitomo (SEI) Steel Wire Corp., Hyogo (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/570,318

(22) PCT Filed: Sep. 1, 2004

(86) PCT No.: PCT/JP2004/012658

§ 371 (c)(1),
(2), (4) Date: Mar. 2, 2006

(87) PCT Pub. No.: WO2005/024851

PCT Pub. Date: Mar. 12, 2005

(65) Prior Publication Data

US 2007/0017691 A1    Jan. 25, 2007

(30) Foreign Application Priority Data

Sep. 2, 2003 (JP) ............................. 2003-309545

(51) Int. Cl.
*H01B 5/00* (2006.01)

(52) U.S. Cl. ................. 174/126.1; 174/126.2
(58) Field of Classification Search ................ 174/36, 174/113 R, 120 R, 126.1, 128.1, 128.2, 126.2
See application file for complete search history.

(56) References Cited

U.S. PATENT DOCUMENTS

| | | | | | |
|---|---|---|---|---|---|
| 3,131,469 | A | * | 5/1964 | Glaze | 228/136 |
| 3,339,012 | A | * | 8/1967 | Hutchins, Jr. | 174/128.1 |
| 3,647,939 | A | * | 3/1972 | Schoerner | 174/128.1 |
| 4,349,694 | A | * | 9/1982 | Vives | 174/128.1 |
| 4,640,983 | A | * | 2/1987 | Comte | 174/119 R |
| 4,689,444 | A | * | 8/1987 | Burgess | 174/128.1 |
| 4,734,545 | A | * | 3/1988 | Susuki et al. | 174/120 SR |
| 5,216,205 | A | * | 6/1993 | Fujii et al. | 174/128.1 |
| 5,760,341 | A | * | 6/1998 | Laske et al. | 174/126.2 |
| 5,969,229 | A | * | 10/1999 | Hori et al. | 73/23.31 |

(Continued)

FOREIGN PATENT DOCUMENTS

EP    0 331 182    3/1989

(Continued)

*Primary Examiner*—William H. Mayo, III
(74) *Attorney, Agent, or Firm*—McDermott Will & Emery LLP

(57) ABSTRACT

A lightweight insulated electric wire and an automobile wire harness using the same insulated electric wire where the insulated electric wire has a conductor portion including one or more first wires and one or more second wires, which are stranded together. The first wires are constituted by metal wires made from at least one type of metal selected from copper, copper alloy, aluminum and aluminum alloy. The second wires are constituted by metal wires different from the first wires and have a relative permeability of 4.0 or less.

6 Claims, 2 Drawing Sheets

U.S. PATENT DOCUMENTS

| | | | |
|---|---|---|---|
| 6,248,955 B1 * | 6/2001 | Avellanet | 174/128.1 |
| 6,303,868 B1 * | 10/2001 | Kawai | 174/128.1 |
| 6,313,409 B1 * | 11/2001 | Bales et al. | 174/128.1 |
| 6,399,886 B1 * | 6/2002 | Avellanet | 174/128.1 |
| 6,448,502 B2 * | 9/2002 | Reynolds et al. | 174/128.1 |
| 6,642,456 B2 * | 11/2003 | Valadez et al. | 174/126.1 |
| 6,674,011 B2 * | 1/2004 | Ueno et al. | 174/128.1 |

FOREIGN PATENT DOCUMENTS

| | | |
|---|---|---|
| JP | 57-23415 | 2/1982 |
| JP | 63-23015 | 4/1988 |
| JP | 1-225006 | 9/1989 |
| JP | 01-283707 | 11/1989 |
| JP | 7-31939 | 4/1995 |
| JP | 09-180550 | 7/1997 |
| JP | 2001-057114 | 2/2001 |
| JP | 2004-207079 | 7/2004 |
| JP | 2004-281241 | 10/2004 |

* cited by examiner

US 7,230,186 B2

COVERED WIRE AND AUTOMOBILE-USE WIRE HARNESS

RELATED APPLICATION

This application is a national phase of PCT/JP2004/012658 filed on Sep. 1, 2004, which claims priority from Japanese Application No. 2003-309545 was filed on Sep. 2, 2003, the disclosures of which Applications are incorporated by reference herein. The benefit of the filing and priority dates of the International and Japanese Applications is respectfully requested.

TECHNICAL FIELD

The present invention relates to an insulated electric wire and an automobile wire harness having the same insulated electric wire. Particularly, the present invention relates to a lightweight insulated electric wire capable of reducing influences of external magnetic fields.

BACKGROUND ART

In general, an automobile is equipped with a wire harness (internal wirings) within the vehicle and the wire harness is used for feeding electricity to electrical equipments within the vehicle, communication and sensing, etc. Such wire harness is generally constituted of electric wires, protective members and terminals such as connectors which are mounted to the end portions of the electric wires. Conventionally, metal wires constituted mainly of copper are employed as the conductors of the electric wires.

In recent years, weight reduction of vehicular components has been advanced due to demands for fuel consumption reduction and a wire harness is no exception. Also, because of the necessity of resources saving and recycles, there is a need for reduction of the amount of copper used for electric wires.

There are two important characteristics required for electric wires. One of them is the electrical conductivity and the other is the tensile strength. Copper, which is often used for the conductors of electric wires of the aforementioned wire harness, is a metal material with a very low electrical resistance. Therefore, the electric wires which have the conductors made of copper can offer sufficient conductivities even when they have relatively small wire diameters. However, in order to maintain a tensile strength required for electric wires, the wire diameters must be made large to some degree. Consequently, there is the necessity of reducing the amount of copper used for electric wires while maintaining the tensile strength.

On the other hand, there are electric-wire conductors made of stainless steel wires with a copper layer on their outer circumferences (refer to, for example, Patent Document 1 and 2). Further, as electric-wire conductors consisting of different types of metal wires stranded together, there are stranded wires consisting of stainless steel wires and copper wires (refer to, for example, Patent Documents 3 and 4).

Patent Document 1: JP-A No. 1-283707
Patent Document 2: JP-B No. 7-31939
Patent Document 3: JP-B No. 63-23015
Patent Document 4: JP-A No. 1-225006

DISCLOSURE OF INVENTION

Problem to be Solved by the Invention

As a measure for reducing the amount of copper used in the conductors of electric wires in the aforementioned wire harness while maintaining a predetermined tensile strength, there is a possibility to use of metal wires made from metal other than copper which have higher hardness than copper or metal wires made from copper alloys. As such metals other than copper, there is, for example, aluminum. However, aluminum has lower ductility than copper and thus has a problem that it will be prone to fracture during crimping of terminals to the end portions of the conductors. Although it is possible to subject aluminum to a thermal treatment or to alloy aluminum to enhance the ductility of aluminum for preventing fractures during crimping, these methods do not enable easily achieving both a high strength and high ductility and thus are not sufficient solutions. Also, when copper alloy is used for electric wires, it is essentially impossible to expect significant enhancement of the strength, which imposes limitations on reducing the amount of copper used for electric wires and weight reduction, in view of the strength required for electric wires.

Therefore, it is possible to provide conductors made from a combination of several types of metals, not from a single type of metal as previously described. For example, the conductors described in Patent Documents 1 and 2 are made of stainless steel wires and a copper layer which is formed on their outer circumferences by a plating method or a cladding method with the copper layer having a cross section ratio of 5 to 70% and therefore have low conductor resistance, high tensile strengths and excellent ductility. However, for such conductors, it is necessary to form a copper layer after the fabrication of stainless steel wires, which may increase the production time and also significantly increase the cost in the case of forming such a copper layer by an existing plating method or cladding method.

On the other hand, the conductors described in Patent Documents 3 and 4 can be produced with relatively low costs and with enhanced strengths by stranding together metal wires made of copper or the like and stainless steel wires. However, in recent years, a great number of electric wires such as signal wires and power-supply electric wires (power cables) have been mixed and placed in a small space within a vehicle, in order to support multi-functions of an automobile. Under the circumstances, the present inventors conducted studies and obtained knowledge as follows. That is, an alternating current flowing through a power cable may cause various deteriorations in the other electric wires placed near the power cable.

More specifically, when electric wires such as signal wires are placed near the aforementioned power cable, while energizing the cable, magnetic fields induced by energizing may cause iron losses (eddy current losses) in the other electric wires, which may increase the temperatures of these electric wires and increase the temperatures of the conductors to above the permissible temperature thereof, thus accelerating the degradation of the insulation layers formed on the outer circumferences of the conductors or causing short-circuit accidents due to poor insulation before reaching the expected life of the insulation layer.

Further, when signal wires are placed near the aforementioned power cable and an alternating current or a high-frequency pulse signal is flowed through the cable, magnetic fluxes are induced in the signal wires, thus resulting in excessive electromagnetic induction noise.

Therefore, it is a main object of the present invention to provide a more lightweight insulated electric wire having an excellent electrical conductivity and a high strength while being capable of reducing influences of ambient magnetic fields, in view of the aforementioned circumstances. It is another object of the present invention to provide an automobile wire harness including such an insulated electric wire.

Means for Solving Problem

The present invention attains the aforementioned objects by constituting the conductor portion by several types of metal wires and by specifying the relative permeability of the wires.

That is, in the present invention, an insulated electric wire includes a conductor portion constituted by one or more first wires and one or more second wires which are stranded together. The first wires are metal wires made of at least one metal selected from a group consisting of copper, copper alloy, aluminum and aluminum alloy. Further, the second wires are constituted by metal wires different from the first wires, and are wires having a relative permeability of 4.0 or less.

The present invention employs, as the first wires, a material having low electrical resistance and, more specifically, at least one type of metal selected from a group consisting of copper, copper alloy, aluminum and aluminum alloy, in order to ensure an excellent electrical conductivity. Next, the present invention employs, as the second wires, metal wires different from the first wires, preferably high-strength metal wires, in order to reduce the amount of copper used therein for reducing the weight and enhancing the strength, such as the tensile strength.

Further, the present invention specifies the relative permeability of the constituent materials of the conductor portion in order to suppress eddy current losses, because it is desirable to effectively suppress excessive temperature rises, particularly at the conductor portion of the electric wire due to eddy current losses caused by external magnetic fields generated from a power cable since it is placed near the power cable flowing an alternating current therethrough. More specifically, the present invention specifies that the relative permeability of the second wires is 4.0 or less.

Hereinafter, the present invention will be described in more detail.

The insulated electric wire according to the present invention includes a conductor portion consisting of first wires and second wires.

(Conductor Portion)

(First Wire)

As the first wires, metal wires made from at least one type of metal selected from a group consisting of copper, copper alloy, aluminum and aluminum alloy are employed. Further, more than a single first wire is employed. Plural first wires may be employed and, in this case, the first wires may be constituted either by the same type of metal wires or by various types of metal wires. This is also applied to the second wires. When aluminum wires or aluminum-alloy wires are employed as the first wires, the weight can be made smaller than when employing copper wires or copper-alloy wires.

As copper wires, it is possible to employ copper wires whose chemical compositions consist of copper and unavoidable impurities. As copper-alloy wires, it is possible to employ copper alloy wires made of chemical constituents consisting of copper, one or more elements selected from a group consisting of Sn, Ag, Ni, Si, Cr, Zr, In, Al, Ti, Fe, P, Mg, Zn and Be, and unavoidable impurities. As aluminum wires, it is possible to employ aluminum wires whose chemical compositions consist of aluminum and unavoidable impurities. As aluminum-alloy wires, it is possible to employ aluminum-alloy wires whose chemical compositions consist of aluminum, one or more elements selected from a group consisting of Mg, Si, Cu, Ti, B, Mn, Cr, Ni, Fe, Sc and Zr, and unavoidable impurities.

(Second Wire)

As the second wires, metal wires different from the first wires are employed. The wires made of metal except copper, copper alloy, aluminum and aluminum alloy described above are employed. Especially, high-strength materials having an excellent tensile strength, etc. are suitable as the second wires. More specifically, it is possible to employ stainless steel and titanium alloy, etc. It is also possible to employ known metal materials or alloy materials. By employing such metal wires having excellent strengths, it is possible to reduce the amount of copper contained in the wires for reducing the weight and to enhance the strength. The present invention employs, as the second wires, wires having a relative permeability of 4.0 or less (in a test atmosphere where there is a magnetic field H of 50 Oe ($50 \times 1/4\pi \times 10^3$ A/m)). By setting the relative permeability to 4.0 or less, it is possible to alleviate the heat generation due to eddy current losses caused by magnetic fields from the power cable, etc. In order to suppress temperature rises more effectively, it is preferable to set the relative permeability to 2.0 or less.

When the other electric wires are placed near an electric wire such as a power cable through which an alternating current is flowed, if the electric wire such as a power cable is energized, they will generate heat due to eddy current losses caused by influences of magnetic fields from the cable. In this case, the temperatures of the electric wires (particularly, the conductor portions) are increased and further the temperatures of other electric wires placed around the electric wires may be also increased. Particularly, electric wires used in an automobile wire harness have extremely small wire diameters and, even though each electric wire causes slight heat generation, the entire bundle of electric wires may cause a nonnegligible amount of heat, since a great number of electric wires, such as about 200 to 400 electric wires, may be bundled together, depending on the type of the automobile. Further, this heat may cause the permissible conductor temperature (for example, 80° C.) to be exceeded, and the temperature rise may cause degradation of the insulation layer (insulator) and electrical failures, thus resulting in short circuits, etc. As a countermeasure against such deterioration, it is possible to employ electric wires made of materials with higher conductor resistances for suppressing the temperature of the conductor to the permissible temperature or less. However, this method requires increasing the cross section of the conductor for providing a required amount of electric current, which involves increases of the weight and the size of the harness, thereby preventing the weight reduction. As parameters for changing the amount of eddy current losses, there are possibly the frequency of the alternating magnetic field and the relative permeability of the conductor material, as well as the electrical conductivity of the aforementioned electric wires. Also, by employing an insulated material with higher heat resistance or by spacing the power-supply cable apart from the other electric wires, it is possible to alleviate eddy current losses. However, it is generally difficult to change the frequency of the AC magnetic field since it is restricted by electric-current specifications, etc. Also, the utilization of an insulated material with higher heat resistance will increase the cost. Further, spacing the power-supply power cable apart from the other electric wires has limitations in terms of space. Therefore, the present invention controls the relative permeability of the second wires constituting the conductor portion, in order to suppress temperature rises due to influences of external magnetic fields.

Further, utilization of metal wires with a relative permeability of 1.1 or less as the second wires can improve the noise characteristics, in addition to offering the effect of reducing temperature rises as previously described, and therefore is preferable. As previously described, in recent years, efforts have been made to reduce the weights and the diameters of electric wires used in an automobile wire harness, in order to support multi-functions of automobiles. As a result, a large number of electric wires such as signal wires and power-supply cables have been mixed and placed in a small space within an automobile. Under the circumstances, the present inventors conducted investigations and found the following facts. That is, when a large number of electric wires each including a conductor using magnetic, high-strength steel wires as the second wires are densely placed and, at this state, an alternating current or a high-frequency pulse signal flows through a power-supply cable or the like placed near the electric wires, magnetic fluxes may be induced thus resulting in the occurrences of excessive electromagnetic induction noise in the electric circuit which includes these electric wires, depending on material properties of steel wire. Further, it was found that, in order to reduce electromagnetic induction noise as aforementioned, it is effective to set the relative permeability to 1.1 or less. Therefore, when it is desired that the noise characteristics are improved, such as when the electric wires according to the present invention are used as signal wires, etc., it is suggested that the relative permeability be set to 1.1 or less.

As a concrete method for setting the relative permeability of the second wires to 4.0 or less, for example, it is possible to employ, as a chemical composition thereof, a material with a relatively low relative permeability such as Ti. Also, when γ (austenitic) stainless steel wires which are relatively low-price and high-strength materials are employed, it is possible to reduce the relative permeability with manufacturing conditions. More specifically, as a stainless steel, it is possible to employ, for example, SUS302 or SUS304 which are metastable austenitic stainless steels with relatively low relative permeability. As such a stainless steel, a well-known stainless steel may be employed.

Also, it is possible to reduce the relative permeability more effectively, by using a stainless steel produced under a specific manufacturing condition. More specifically, it is possible to select a manufacturing condition which can reduce the amount of strain induced martensite, which may cause increases in the relative permeability of the austenitic stainless steel. For example, the total reduction in area can be reduced during the drawing. The amount of strain induced martensite is increased with increasing the reduction ratio of drawing, and therefore it is possible to control the amount of induced martensite through the reduction ratio (the reduction in area). By reducing the total reduction ratio, it is possible to reduce the relative permeability even for stainless steels with the same compositions. By setting the reduction ratio to about 90% or less, the relative permeability may be made to be 4.0 or less and, by setting the reduction ratio to 75% or less, the relative permeability may be made to be 2.0 or less, even though some variations may occur depending on the wire diameter, the die diameter and the die shape. Further, in order to make the relative permeability to 1.1 or less, the reduction ratio may be set to 40% or less. The smaller the reduction ratio, the more significantly the strain induced martensite can be suppressed. However, in order to provide a conductor with a tensile strength of 500 MPa or higher, it is preferable that the reduction ratio is set greater, to some degree, as will be described later. For example, when a conductor is formed from three copper wires with a wire diameter of about 0.16 mmφ and four stainless steel wires with the same wire diameter, it is preferable to set the total reduction ratio of the stainless steel wires to 30% or more. The lower the ambient temperature of the stainless steel during the drawing, the more easily the martensite phase is induced. Therefore, it is also effective to increase the working temperature, for example, by interrupting the cooling of the dies during the drawing or by interrupting the cooling of the capstan used for winding the drawn wire.

When a drawing with a total reduction in area above 40% is performed, by applying a thermal treatment thereto after the drawing, it is possible to reduce the strain induced martensite which has been formed by the drawing. Preferably, the aforementioned thermal treatment is carried out at a temperature below conventional solution treatment temperature (in the range of over 1000° C. to 1100° C. or less), and more specifically, at a temperature within the range of 800 to 1000° C. By applying such a thermal treatment, the relative permeability can be changed in accordance with the conditions of heat generation and noise reduction.

By applying a drawing with a reduction ratio within a specific range or by applying a specific thermal treatment after the drawing as described above, it is possible to reduce the relative permeability without causing significant degradation of the tensile strength. In view of enhancement of the noise characteristics, the smaller the amount of the strain induced martensite, the more preferable, and the amount of the strain induced martensite is preferably 10 vol. % or less and more preferably 5 vol. % or less.

(Entire Configuration)

The conductor portion is constituted by the aforementioned first wires and second wires which are stranded together. One or more first wires and one or more second wires are employed. For example, a single second wire may be used as a center wire and seven or eight first wires are employed as outer wires to form a strand wire or plural first wires and plural second wires may be employed to form a strand wire. Also, plural second wires may be stranded together and used as a center wire and first wires (outer wires) may be stranded around the outer circumference thereof. By employing plural second wires, for example, when they are placed near an automobile engine, it is possible to prevent breaking of wires due to vibrations of the engine. The greater the amount of the first wires included in the conductor portion, the lower the conductor resistance, but the smaller the strength tends to be. On the other hand, the greater the amount of the second wires included in the conductor portion, the higher the strength, but the higher the conductor resistance tends to be. Accordingly, it is preferable to select the numbers of the first wires and the second wires so that a proper electrical conductivity and a proper strength can be provided. The insulated electric wire according to the present invention is suitable as an electric wire in an automobile wire harness, and more specifically, usable as a signal wire for communication, a power-supply electric wire (power cable) for feeding electric power to apparatuses or a earthing wire, etc. Particularly, when it is used as a signal wire in an automobile wire harness, in consideration of voltage drops and the permissible current value in passing signals or electric currents therethrough, it is preferable that the conductivity of the conductor portion is within the range of 2 to 60% IACS. Also, when it is used as a power-supply electric wire, it is preferable that the conductivity of the conductor portion is 80% IACS or more. It is preferable to combine the first wires and the second wires so that the aforementioned conductivity can be provided.

Further, when it is used as an electric wire in an automobile wire harness, it is preferable that the tensile strength of the conductor portion is within the range of 400 to 700 MPa. Conventional conductors constituted only by copper wires have tensile strengths within the range of 250 to 350 MPa. Thus, in the case of conventional conductors, in order to provide an electric-wire breaking load equivalent to that of the aforementioned high-strength conductor, the wire diameter must be increased. On the other hand, the electric wire according to the present invention has an enhanced strength as aforementioned. For example, when a tensile strength of 500 MPa or more is required, the electric wire according to the present invention can have a wire diameter which is reduced by at least 20% and by about 70% at a maximum from those of conductors constituted only by copper wires. Consequently, the present invention can increase the strength while reducing the wire diameter.

An insulator (insulation layer) made of vinyl chloride, etc., is formed on the outer circumference of the conductor portion constituted by wires which are stranded together. Further, the stranded conductor portion can be drawn and compressed to further reduce the diameter thereof.

(Terminal Portion)

A terminal portion is mounted to the end portion of the aforementioned conductor portion in order to enable electrically connecting the conductor portion to an external component. In the present invention, as previously described, the conductor portion is formed from a combination of several types of metal. When the conductor is formed from several types of metals as described above, there is a problem which has not been induced for conductors formed from a single type of metal, more specifically, the problem of the occurrence of cell corrosion while the conductor is being energized due to the difference in the ionization tendency of the metals. Generally, a terminal mounted to the end portion of a conductor portion is made from metal. When the terminal portion is formed from a metal different from the constituent metals of the conductor portion, cell corrosion may occur. However, conventionally, sufficient studies have not been conducted for measures to cases of combining different types of metals, particularly to cases where the terminal is also included in the combination.

More specifically, evaluations of corrosion-resistance tests have been conducted only by exposing only the conductor portion to a corrosive environment and have not been conducted under conditions where currents and voltages equivalent to those used in actual apparatuses are loaded. Thus, conventionally, material screenings for the materials of the terminal as well as the conductor have not been sufficiently performed in view of cell corrosion. Therefore, the present inventors conducted studies about materials in view of the aforementioned cell corrosion and obtained the following knowledge.

1. If a current flows through the terminal under a condition where the terminal is exposed to rain water, a cell is formed between the different types of materials which constitute the terminal and the conductor, which may acceleratingly facilitate corrosion of the terminal, thus rapidly degrading the fixing strength between the conductor and the terminal.

2. If corrosion occurs between the conductor and the terminal or between the wires constituting the conductor, this may increase the electric resistance, thus preventing provision of required amounts of current.

Generally, when different types of metals make contact with one another and lie in an environment where they can exchange electrons while being energized, cell corrosion occurs since these metals have different tendencies for generating electrons. Particularly, in an automobile wire harness, the contact resistances between the conductor portion and the terminal portion causes large local electric-potential differences and, when the automobile wire harness is exposed to a corrosive environment such as an environment where it is brought into contact with rainwater or water vapor, corrosion tends to significantly advance. Therefore, the present inventors conducted studies and obtained knowledge as follows. That is, in order to prevent such cell corrosion, it is desirable to select materials such that the corrosive electric-potential difference between the constituent wires of the conductor portion and the corrosive electric-potential difference between the wires and the terminal portion fall within a specific range. Further, in view of suppression of cell corrosion, it is preferable to select the constituent materials of the first wires, the second wires and the terminal portion such that the corrosive electric-potential difference between the first wires and the second wires, the corrosive electric-potential difference between the first wires and the terminal portion and the corrosive electric-potential difference between the second wires and the terminal portion are all 0.5 V or less. Particularly, it is preferable to employ, as the constituent metal material of the terminal portion, a metal different from at least one of the first wires and the second wires. In other words, it is possible to employ, for the terminal portion, the same type of metal as that of the first wires or the second wires, provided that the aforementioned relationships in the corrosive electric-potential differences are satisfied. More specifically, it is possible to employ either the same type of metal as that of the first wires or a metal which is not selected for the first wires, out of a group consisting of copper, copper alloy, aluminum and aluminum alloy. Further, it is possible to employ either the same type of metal as that of the second wires or a metal which is not selected for the second wires, out of a group consisting of stainless steel, titanium alloy and carbon steel etc. More specifically, for example, when copper wires are employed as the first wires, the terminal portion may be made from either copper or a copper alloy such as a brass. When stainless steel wires are employed as the second wires, the terminal portion may be made from stainless steel. Also, it is preferable to mount the terminal portion by crimping such as staking.

With a wire harness of the present invention including at least a electric wire of the present invention having the aforementioned configuration, it is possible to suppress temperature rises in the respective electric wires due to heat generation caused by external magnetic fields, thus preventing temperature rises in the other electric wires placed around the respective electric wires. Consequently, the automobile wire harness according to the present invention enables effectively preventing heat generation in the electric-wire bundle caused by external magnetic fields and thermal degradation caused by temperature rises.

Effect of the Invention

In the insulated electric wire according to the present invention and the wire harness according to the present invention which includes such electric wire, the conductor portion is constituted by a combination of several types of metals for reducing the amount of copper used therein, thus realizing weight reduction, strength enhancement and cost reduction. Particularly, the present invention specifies the relative permeability of the second wires constituting the conductor portion to suppress temperature rises caused by influences of external magnetic fields, more specifically eddy current losses, thus suppressing degradation of the insulation layer and occurrences of short-circuits. Also, by further reducing the relative permeability, it is possible to reduce electromagnetic induction noise, thus improving the signal characteristics. Further, the present invention specifies the corrosive electric-potential differences between the wires made from different types of metals and between the wires and the terminal portion to fall within a specific range, in order to effectively suppress cell corrosion to improve the corrosion resistance. In addition, the present invention can enhance the recyclability by reducing the amount of copper used for wires. Therefore, the present invention is extremely useful and industrially valuable, in view of future environmental problems.

BEST MODE FOR CARRYING OUT THE INVENTION

Hereinafter, embodiments of the present invention will be described.

Example 1

Insulated electric wires each including a conductor were produced, wherein the respective conductors of the insulated electric wires have different relative permeability. A plurality of such electric wires is bundled into an electric-wire bundle and the electric-wire bundle is placed near an AC-power-supply cable. Then, the temperature change at the electric wires was measured when an alternating current was flowed through the cable.

The conductor portions utilized for tests had a nine-strand configuration consisting of a single second wire as a center wire and eight first wires stranded therearound as outer wires. The respective first wires used therein were copper wires with a wire diameter of ϕ0.140 mm made of tough pitch copper (C1100). The second wires used therein were stainless steel wires with a wire diameter of ϕ0.225 mm and the relative permeability thereof was varied by varying the total reduction in area. More specifically, a sample No. A with a relative permeability of 2.0 was produced from a stainless steel made from SUS304 by applying a drawing with a total reduction in area of about 70%. A sample No. B with a relative permeability of 4.0 was produced from a stainless steel made from SUS304 by applying a drawing with a total reduction in area of about 90%. A sample No. C with a relative permeability of 6.0 was produced from a stainless steel made of SUS631 by applying a drawing process with a total reduction in area of about 70%. These stainless steel wires were used at centers and stranded together with copper wires to form conductor portions. The conductivity of the respective conductor portions was determined and the results were as follows: the sample No. A: 17.5% IACS, the sample No. B: 17.8% IACS, and the sample No. C: 18.4% IACS. Further, the tensile strengths of the respective conductor portions were determined and the results were as follows: the sample No. A: 552 MPa, the sample No. B: 776 MPa, and the sample No. C: 632 MPa. An insulation layer (with a thickness of 0.20 mm) made from vinyl chloride was formed on the outer circumference of each of the conductor portions to form insulated electric wires. For each sample, about 200 insulated electric wires were prepared and were bound by a thermal insulation tape to form a electric-wire bundle. In the present example, the length $l_1$ of the electric-wire bundles 10 was set to 0.3 to 0.4 m.

FIG. 1(A) is an explanation view illustrating a method for measuring temperature changes in an electric-wire bundle. FIG. 1(B) is an explanation view illustrating a state where the electric-wire bundle is affected by a magnetic field generated from an AC-power-supply cable. The electric-wire bundle 10 constituted by plural insulated electric wires 11 bound by a thermal insulation tape 12 as previously described was placed in parallel with the power cable 30. In the present example, the center distance $l_2$ between the power cable 30 and the electric-wire bundle 10 was set to 0.1 m. The power cable 30 used in the present example included a copper conductor. While energizing the cable, a current which is close to a permissible current was flowed through the cable 30 and the temperature of the copper conductor rose to about 80° C. The cable 30 was connected to an AC power supply 20 capable of varying the output frequency, through an energizing current transformer 21. The energizing current transformer 21 was connected to a u terminal 22 and a v terminal 23 of the power supply 20. On the surface of the electric-wire bundle 10, the tip of a probe 41 connected to a thermometer 40 was placed to enable measuring the temperature of the center portion of the electric-wire bundle 10. At this state, when the AC power supply 20 was connected to a plug socket and the AC-power-supply cable 30 was energized (there is illustrated, in FIG. 1(B), a state where a current flows from the front to back side of the paper), the cable 30 generated a magnetic field in the direction of the arrow in FIG. 1(B) and the electric-wire bundle 10 was affected by the magnetic field. More specifically, eddy current loses were generated to cause heat generation, thus increasing the temperature. FIG. 2 shows the results of the tests. FIG. 2 also shows the results of trial calculations (curve D). Further, in these tests, the condition of energizing the cable 30 was as follows: the current: 100 A and the frequency: 1000 Hz.

In FIG. 2, the difference between the results of the trial calculations and the data of the experiments (round marks in FIG. 2) was caused since the insulator (the insulation layer and the thermal insulation tape) formed on the electric wires reduced the heat release, thus increasing the measured temperature rise. However, the trial-calculation results and the experiment data reveal that, the smaller the relative permeability, the smaller the temperature rises. Consequently, it can be proven that it is preferable to make the relative permeability smaller to suppress temperature rises caused by eddy current losses. More specifically, when the permissible temperature of the conductor is 80° C., the ambient temperature of the electric wires is 40° C. and the difference between the permissible temperature and the ambient temperature, namely 80–40=40 (K), is the permissible temperature difference, in order to make the permissible range of the temperature rise to be 5% or less of the permissible temperature difference, namely 40K×5%=2K or less, it is preferable to set the relative permeability to 4.0 or less, in taking account of the difference between the trial calculation result and the experiment data. Further, in order to make the permissible range of the temperature rise to be 1% or less, namely 40K×1%=0.4K or less, it is preferable to set the relative permeability to 2.0 or less, in taking account of the difference between the trial calculation result and the experiment data.

By controlling the relative permeability using the result of the aforementioned tests, it is possible to reduce heat generation and temperature rises of the electric wire due to external magnetic fields and to prevent temperature rises in the other electric wires constituting the electric-wire bundle. Therefore, by utilizing the insulated electric wires according to the present invention, it is possible to effectively prevent heat generation and thermal degradation in the electric-wire bundle due to external magnetic fields, in the case where the electric-wire bundle is used in a wire harnesses, etc.

Example 2

Conductor portions and terminal portions were produced from metal materials shown in Table 1 and the terminal portions were mounted to the end portions of the conductor portions to form insulated electric wires. Further, salt spray tests were conducted for the resultant insulated electric wires under a condition designated in Table 2. Thereafter, the rate of reduction of the fixing-strength of each terminal portion was determined to evaluate the corrosion resistance. Table 3 shows the results of the tests.

Each conductor was produced by stranding together three first wires and four second wires, namely a total of seven wires. The first wires and the second wires both had a wire diameter of φ0.16 mm. Then, after stranding, an insulation layer (with a thickness of 0.20 mm) made from vinyl chloride was formed on the outer circumference thereof. The terminal portions were formed to have an ordinary connector shape used for automobile wire harnesses.

Further, the corrosive electric-potential difference between the first wires and the second wires, the corrosive electric-potential difference between the first wires and the terminal portion, and the corrosive electric-potential difference between the second wires and the terminal portion were determined. Table 1 shows these corrosive electric-potential differences.

The corrosive electric-potential differences (V), in Table 1, were calculated from the corrosive electric potentials of the respective metals within seawater at a room temperature (with a flow velocity of 3.0 m/s and a temperature of 20° C.). In Table 1, the copper used for the first wires was a tough pitch copper (C1100), the copper alloy was a 70Cu-30Ni alloy, the aluminum alloy used for the first wires was one defined in JIS 7075, and the aluminum alloy used for the terminal portion was one defined in JIS 6061. The stainless steel used for the second wires and the terminal portions was one defined in JIS SUS304S (with a total reduction in area: 70%) which has been subjected to a softening (solution treatment) (1150° C.×3 seconds). The titanium alloy used for the second wires was one with compositions constituents (wt. %) of Ti-22V-4Al (DAT51™, manufactured by Daido Steel Co., Ltd.). The steel used for the second wires was SWP-B (wire material SWRS82B) defined in JIS. Further, the relative permeability of the second wires was as follows: the stainless steel: 1.0012, the aluminum alloy: 1.0002, and the titanium alloy: 1.0001. The relative permeability of the steel wires was not measured, but steel wires generally have high relative permeability within the range of about 5000 to 7000.

In Table 3, the rate of reduction of the fixing strength was determined by making comparison between the tensile strengths before and after the salt spray test.

TABLE 2

| | |
|---|---|
| Temperature during the test | 35° C. |
| Concentration of saltwater | 5 mass % (artificial saltwater) |
| pH | 6.8 |
| Specific gravity | 1.03 |
| Pressure | 99.8 kPa |
| Spray time | 96 hours |
| Retaining of the thermostat and humidistat bath after salt spray | 80° C. × humidity 93% × 96 hours |
| Load voltage | 15 V |

TABLE 3

| Sample No. | Rate of reduction of fixing strength (%) |
|---|---|
| 1-1 | 0 |
| 1-2 | 0 |
| 1-3 | 54 |
| 1-4 | Incapable of measurement (elution of all the aluminum) |
| 1-5 | 86 |
| 1-6 | 50 |
| 1-7 | Incapable of measurement (elution of all the aluminum) |
| 1-8 | 0 |

TABLE 1

| Sample No. | First wire (A) | Second wire (B) | Terminal portion (C) | Corrosive electric-potential difference (V) | | |
|---|---|---|---|---|---|---|
| | | | | Between (A) and (B) | Between (B) and (C) | Between (A) and (C) |
| 1-1 | Aluminum alloy | Steel | Aluminum alloy | 0.15 | 0.07 | 0.08 |
| 1-2 | Copper | Stainless steel | Brass | 0.25 | 0.27 | 0.02 |
| 1-3 | Copper | Aluminum alloy | Brass | 0.61 | 0.58 | 0.02 |
| 1-4 | Aluminum alloy | Titanium alloy | Aluminum alloy | 0.91 | 0.98 | 0.08 |
| 1-5 | Copper | Stainless steel | Aluminum alloy | 0.25 | 0.73 | 0.48 |
| 1-6 | Copper | Steel | Stainless steel | 0.31 | 0.56 | 0.25 |
| 1-7 | Copper alloy | Stainless steel | Aluminum alloy | 0.25 | 0.88 | 0.63 |
| 1-8 | Copper | Titanium alloy | Brass | 0.21 | 0.23 | 0.02 |

After the spray tests, the states of the respective insulated electric wires were inspected. As a result, slight corrosion was observed in the samples Nos. 1-1, 1-2 and 1-8, which exhibited a corrosive electric-potential difference of 0.5V or less between the first wires and the second wires, between the first wires and the terminal portion and between the second wires and the terminal portion. However, as designated in Table 3, the fixing strengths of the samples were not degraded at all, which revealed that they had excellent corrosion resistance.

On the contrary, corrosion was significantly advanced in the samples Nos. 1-3 to 1-7 which exhibited a corrosive electric-potential difference above 0.5 V, between the first wires and the second wires, between the first wires and the terminal portion or between the second wires and the terminal portion. Particularly, since these samples Nos. 1-3 to 1-7 exhibited a corrosive electric-potential difference above 0.5 V between the second wires and the terminal portion, the fixing strengths of their terminal portions were significantly degraded due to corrosion, as shown in Table 3. Further, in the samples Nos. 1-3 and 1-4, significant corrosion was observed between the first wires and the second wires, as well as between the second wires and the terminal portion. Further, in Table 3, for the samples Nos. 1-4 and 1-7, the rate of reduction of the fixing strength is indicated as "incapable of measurement," since corrosion was advanced and thus the aluminum alloy constituting the first wires was eluted, thus leaving only the titanium alloy wires and the stainless steel wires of the second wires.

Further, before the spray test, the conductivity of the conductor portion and the tensile strength of the conductor portion were determined for the samples Nos. 1-1, 1-2 and 1-8 and the following results were obtained: the sample No. 1-1: 32% IACS and 603 MPa, the sample No. 1-2: 38% IACS and 586 MPa, the sample No. 1-8: 40% IACS and 592 MPa. From these tests, it was proven that, by setting the relative permeability of the second wires to a specific value and also by constituting the terminal portion by a specific material, it is possible to provide an electric wire being capable of suppressing temperature rises therein and having excellent corrosion resistance.

Example 3

Stainless steel similar to that of the second wires used in the sample No. 1-2 in the second example was prepared and the relative permeability of the stainless steel was varied. In the present example, the total reduction in area during the drawing was varied within the range of 0 to 70% to vary the relative permeability and the results are shown (FIG. 3). Further, the heating temperature during the softening after the drawing (with a total reduction in area of 70%) was varied within the range of 900 to 1150° C. to vary the relative permeability and the results are shown (FIG. 4). In the softening, the holding time was 3 seconds for each temperature.

As a result, as shown in FIG. 3, it was proven that the relative permeability $\mu$ was able to be varied by varying the reduction in area during the drawing. Particularly, by setting the total reduction in area to 40% or less, the relative permeability $\mu$ can be made to be 1.1 or less.

Further, as shown in FIG. 4, by changing the heating temperature during the softening after the drawing, the relative permeability $\mu$ can be changed. Particularly, by setting it to 1000° C. or higher, the relative permeability $\mu$ can be made to be 1.1 or less, even when the total reduction in area is above 40%.

Signal wires were produced similarly to the sample No. 1-2 in the first example, by employing the stainless steel wires with varying relative permeability as the second wires, and by using the copper wires used in the sample No. 1-2 in the second example as the first wires. Further, these signal wires were wound into a coil shape together with an AC-power-supply electric wire (power cable) used in a conventional automobile wire harness and they were housed within a box which was shielded from external magnetic fluxes. At this state, an alternating current signal was flowed through the AC-power-supply electric wire and the probability of errors was determined for the signal wires. Table 4 represents the total reduction in area during the drawing for the stainless steel wires used for the second wires, the heating temperature during the softening, the relative permeability and the error probability of the signal wires. The error probability was defined as the probability that the amplitude of a high-frequency signal was reduced to 70% or less of a predetermined amplitude.

TABLE 4

| Sample No. | Reduction in area % | Heating temperature × time ° C. × seconds | Relative permeability | Error probability % |
|---|---|---|---|---|
| 2-1 | 0 | Null | 1.004 | 0 |
| 2-2 | 10 | Null | 1.005 | 0 |
| 2-3 | 40 | Null | 1.098 | 5 |
| 2-4 | 70 | Null | 1.564 | 40 |
| 1-2 | 70 | 1150° C. × 3 seconds | 1.003 | 0 |
| 2-5 | 70 | 1000° C. × 3 seconds | 1.057 | 0 |
| 2-6 | 70 | 900° C. × 3 seconds | 1.465 | 44 |

As shown in Table 4, when a metastable austenitic stainless steel such as SUS304 is used, if a drawing is performed with a total reduction in area of 40% or more, signal errors will tend to occur. This is considered to be caused by significant increase of strain induced martensite due to the drawing. The amount of the strain induced martensite was actually determined. As a result, the amount thereof was 26 vol. % in the sample No. 2-3 while it was 57 vol. % in the sample No. 2-4, which was greater.

Further, as shown in Table 4, even when a metastable austenitic stainless steel as SUS304 is employed and a drawing is performed with a total reduction in area of 40% or more, it is possible to prevent the occurrence of signal errors by subsequently applying a thermal treatment. This is considered to be due to that the strain induced martensite which has been induced during the drawing can be reduced by the thermal treatment. The amount of strain induced martensite was actually determined. As a result, the amount thereof was 25 vol. % in the sample No. 2-5, which was reduced from that in the sample No. 2-4.

Consequently, it has been proven that, when stainless steel wires are employed as the second wires, it is possible to suppress temperature rises due to eddy current loses and to effectively prevent signal errors, by controlling the amount of strain induced martensite through the manufacturing condition such as the reduction ratio and the thermal treatment temperature and the like, namely by controlling the relative permeability to within a specific range.

Further, the conductivity of the conductor portion and the tensile strength of the conductor portion were determined for the samples Nos. 2-1 to 2-6 and, as a result, the following results were obtained: the sample No. 2-1: 38% IACS and 543 MPa, the sample No. 2-2: 38% IACS and 562 MPa, the sample No. 2-3: 38% IACS and 591 MPa, the sample No. 2-4: 38% IACS and 655 MPa, the sample No. 2-5: 38%

IACS and 607 MPa, and the sample No. 2-6: 38% IACS and 681 MPa. Thus, it was proven that the samples Nos. 2-1 to 2-6 were sufficiently usable as signal wires for an automobile wire harness, for example. Particularly, it was proven that the samples Nos. 2-1 to 2-3 and 2-5 were more suitable for an automobile wire harness since they exhibited low signal-error probabilities.

INDUSTRIAL APPLICABILITY

The insulated electric wire according to the present invention is most suitable for use as electric wires for an automobile wire harness. More specifically, it is usable as signal wires for communication, power-supply electric wires for feeding electric power to apparatuses or earthing wire, etc.

EXPLANATIONS OF LETTERS OR NUMERALS

Figure 1:
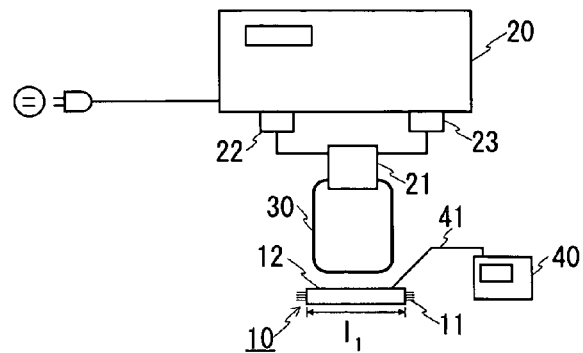
FIG. 1(A) is an explanation view illustrating tests conducted in a first example and illustrating a method for measuring temperature changes in an electric-wire bundle.
FIG. 1(B) is an explanation view illustrating a state where the electric-wire bundle is affected by a magnetic field generated from an AC-power-supply cable.
Figure 1:
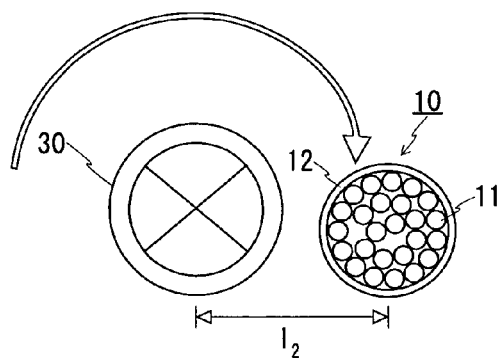
Figure 2:
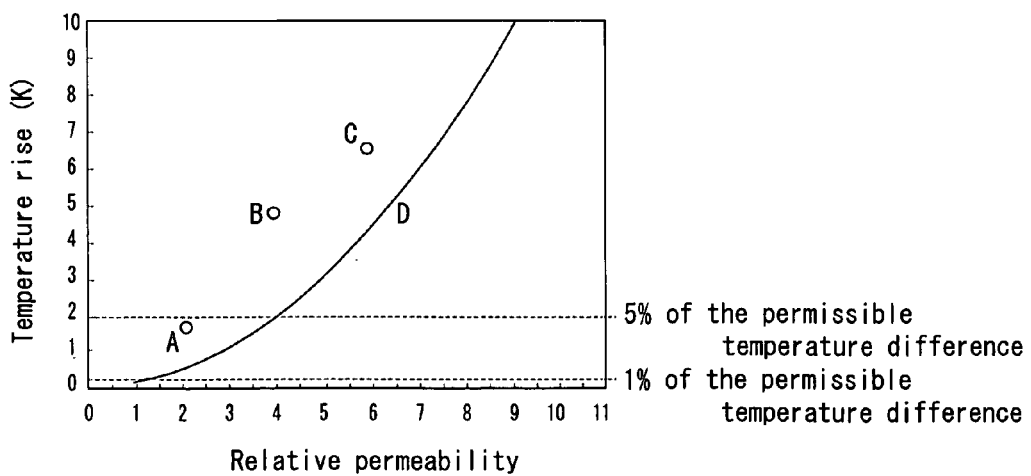
FIG. 2 is a graph illustrating the relationship between the relative permeability and the temperature rise in a signal wire.
Figure 3:
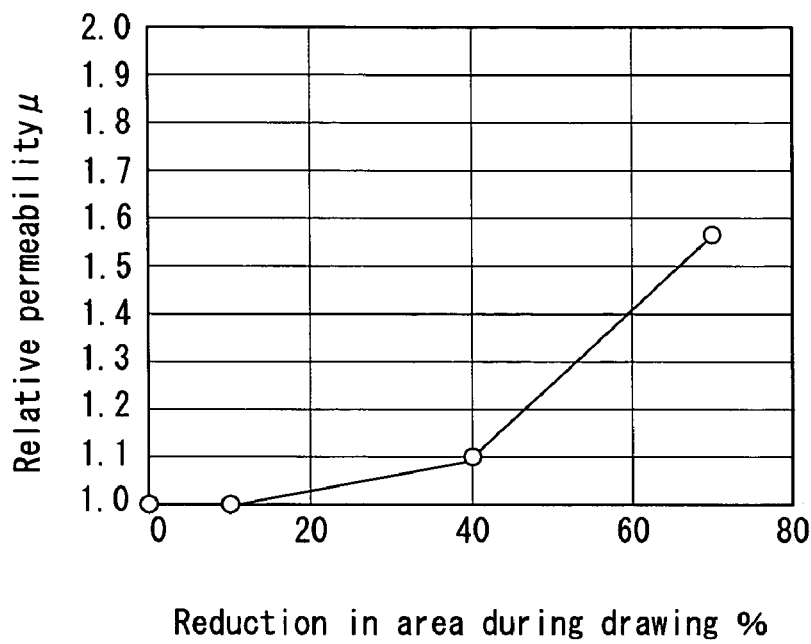
FIG. 3 is a graph illustrating the relationship between the total reduction in area during the drawing and the relative permeability.
Figure 4:
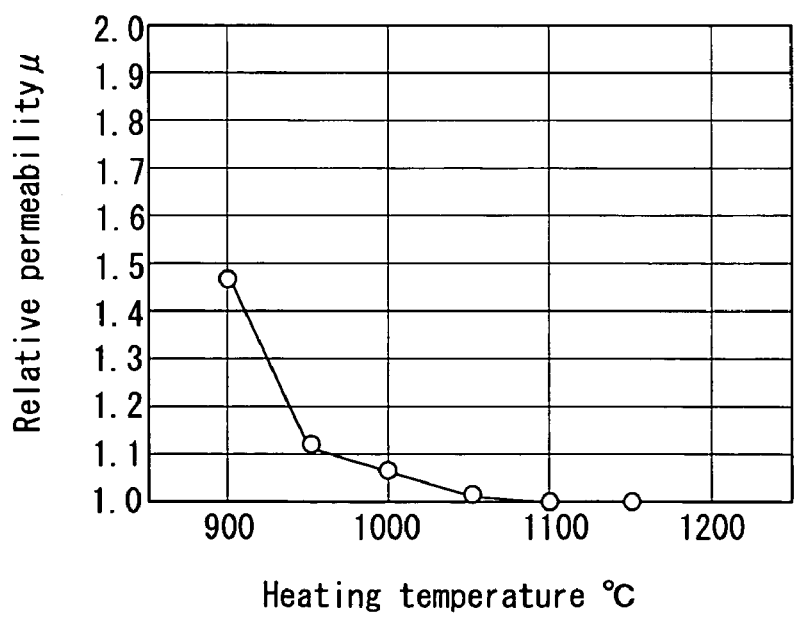
FIG. 4 is a graph illustrating the relationship between the thermal treatment temperature of a solution treatment after the drawing and the relative permeability.

10: electric-wire bundle
11: insulated electric wire
12: thermal insulation tape
20: AC power supply
21: energizing current transformer
22: u terminal
23: v terminal
30: power cable
40: thermometer
41: probe

The invention claimed is:

1. An insulated electric wire, comprising:
   a conductor portion consisting of one or more first wires and one or more second wires which are stranded together;
   wherein said first wires are constituted by metal wires made from at least one type of metal selected from a group consisting of copper, copper alloy, aluminum and aluminum alloy,
   said second wires are constituted by stainless steel, and have a relative permeability of 1.1 or less, and content amount of process induced martensite of 26% by volume or less, and
   the tensile strength of the conductor portion is 400 MPa or more and 700 MPa or less.

2. The insulated electric wire according to claim 1, wherein the content amount of the strain induced martensite of said second wires is 10% by volume or less.

3. The insulated electric wire according to claim 1, wherein the stainless steel is metastable austenite stainless steel.

4. The insulated electric wire according to claim 1, wherein a terminal portion is provided at the end portion of the conductor portion,
   said terminal portion is made from a metal different from at least one of the first wires and the second wires, and
   the corrosive electric-potential difference between the first wires and the second wires, the corrosive electric-potential difference between the first wires and the terminal portion and the corrosive electric-potential difference between the second wires and the terminal portion are all 0.5 V or less.

5. The insulated electric wire according to claim 1, wherein the conductor portion has a conductivity within the range of 2 to 60% IACS.

6. An automobile wire harness comprising the insulated electric wire according to any one of claims 1 to 5.

* * * * *